ELECTRIC PULSE MODULATING AND DEMODULATING CIRCUITS

Filed June 5, 1957

8 Sheets-Sheet 1

FIG. 6.

(a) $$\phi(j\omega) = \frac{2}{t_1 R_1} \cdot \frac{[H(j\omega)]^2}{A(0) + 2\sum_{r=1}^{\infty} \epsilon^{-j\omega r t_1} A(r t_1)}$$

(b) $$\phi(j\omega) = \frac{2}{t_1 R_1} \cdot \frac{[H(j\omega)]^2}{A(0)}$$

(c) $$|H(j\omega)| = R_1 \quad 0 < \omega < \pi/t_1$$
$$= 0 \quad \pi/t_1 < \omega$$

(d) $$A(t) = \frac{2R_1}{t_1} \cdot \frac{\sin \pi t/t_1}{\pi t/t_1}$$

(e) $$|\phi(j\omega)| = 1 \quad 0 < \omega < \pi/t_1$$
$$= 0 \quad \pi/t_1 < \omega$$

(f) $$\phi(j\omega) = \left[\frac{H(j\omega)}{R_1}\right]^2$$

(g) $$\frac{R_1}{R_2} = \frac{t_1}{t_2}$$

(h) $$\left|\frac{H(j\omega)}{R_1}\right|^2 = \frac{1}{1 + \left(\frac{\omega t_1}{\pi}\right)^{2N}}$$

(i) $$C = \frac{t_1}{2R_1} \cdot \frac{2n}{\pi} \sin \frac{\pi}{2N}$$

FIG. 7

(a) $$G\ (j\omega) = \sum_{r=0}^{\infty} \varepsilon^{-j\omega r t_1} A(rt_1)$$

(b) $$G_1\ (j\omega) = \sum_{r=1}^{\infty} \varepsilon^{-j\omega r t_1} A(rt_1)$$

(c) $$\phi_d a\ (j\omega) = \frac{2}{t_1 R_1} \frac{[H\ (j\omega)]^2}{G(j\omega) + G_1\ (j\omega)}$$

FIG. 8.

(a) $j, \omega, \pi, U$ HAVE THE SIGNIFICANCE COMMON IN THE ART
(b) $L$ = INDUCTANCE $C$ = CAPACITANCE
(c) $t$ = TIME VARIABLE
(d) $t_1$ = THE PULSE REPETITION PERIOD
(e) $t_2$ = THE PULSE DURATION OR WIDTH
(f) $R$ = RESISTANCE $H$ = IMPEDANCE
(g) $I$ = CURRENT $A$ = IMPULSE RESPONSE
(h) $G, G_1$ SEE FIG. 7 (a) AND (b)
(i) $N$ = NUMBER OF ELEMENTS IN A FILTER
(j) $\phi$ = INSERTION VOLTAGE RATIO
(k) $r$ = ANY POSITIVE INTEGER
(l) $n$ = ANY INTEGER. $\gamma$ = ATTENUATION
(m) $T$ = TIME DURING WHICH PULSE ENERGY IS RETAINED IN THE STORE
(n) $\hat{I}$ = PEAK CURRENT
(o) $k = C/C'$ $\alpha = 1/\sqrt{LC}$ $\beta = \alpha\sqrt{2k+1}$
(p) $p, q$ ARE ANY INTEGERS

FIG. 9.

(a) $$\Phi_b(j\omega) = \frac{2}{t_1 R_1 C} \cdot \frac{[H(j\omega)]^2}{[G(j\omega)]^2}$$

(b) $$\Phi_c(j\omega) = \frac{2\varepsilon^{-\gamma - j\omega t_1 n/2}}{t_1 R_1 C_1} \cdot \frac{[H(j\omega)]^2}{G(j\omega)^2 - \varepsilon^{-2\gamma - j\omega t_1 n}[G_1(j\omega)]^2}$$

(c) $\varepsilon^{-\gamma - j\omega t_1 n/2}$ WHEN $|\omega| < \pi/t_1$ (d) $0$ WHEN $|\omega| > \pi/t_1$ (e) $$\Phi_d(j\omega) = \frac{2}{t_1 R_1 C} \cdot \varepsilon^{-j\omega T} \cdot \frac{[H(j\omega)]^2}{[G(j\omega)]^2 - \varepsilon^{-j\omega t_1}[G_1(j\omega)]^2}$$

(f) $\varepsilon^{-j\omega T}$ WHEN $|\omega| < \pi/t_1$ (g) $0$ WHEN $|\omega| > \pi/t_1$

FIG. 16.

$$\sqrt{LC} = t_2/\pi \qquad (a)$$

$$\hat{I} = \frac{1}{2}\sqrt{\frac{C}{L}} \qquad (b)$$

$$E_1 = \frac{k}{2k+1}\,U(t) + \frac{1}{2}\cos\alpha t + \frac{1}{2(2k+1)}\cos\beta t \qquad (c)$$

$$E_3 = \frac{k}{2k+1}\,U(t) - \frac{1}{2}\cos\alpha t + \frac{1}{2(2k+1)}\cos\beta t \qquad (d)$$

WHERE $k = C/C'$ $\quad \alpha = 1/\sqrt{LC}$ $\quad \beta = \alpha\sqrt{2k+1}$ $$\sqrt{2k+1} = \frac{\beta}{\alpha} = \frac{p}{q-\frac{1}{2}} \qquad (e)$$

$$E_1 = \frac{3}{8}\,U(t) + \frac{1}{2}\cos\frac{\pi t}{t_2} + \frac{1}{8}\cos\frac{2\pi t}{t_2} \qquad (f)$$

$$E_2 = \frac{3}{8}\,U(t) - \frac{3}{8}\cos\frac{2\pi t}{t_2} \qquad (g)$$

$$E_3 = \frac{3}{8}\,U(t) - \frac{1}{2}\cos\frac{\pi t}{t_2} + \frac{1}{3}\cos\frac{2\pi t}{t_2} \qquad (h)$$

$$I_1 = \frac{1}{2}\sqrt{\frac{C}{L}}\sin\frac{\pi t}{t_2} + \frac{1}{4}\sqrt{\frac{C}{L}}\sin\frac{2\pi t}{t_2} \qquad (i)$$

$$I_2 = \frac{1}{2}\sqrt{\frac{C}{L}}\sin\frac{\pi t}{t_2} - \frac{1}{4}\sqrt{\frac{C}{L}}\sin\frac{2\pi t}{t_2} \qquad (j)$$

$$C/C' = 3/2 \qquad (k)$$

Jan. 15, 1963 K. W. CATTERMOLE ET AL 3,073,903

ELECTRIC PULSE MODULATING AND DEMODULATING CIRCUITS

Filed June 5, 1957 8 Sheets-Sheet 8

United States Patent Office 3,073,903

Patented Jan. 15, 1963

3,073,903

ELECTRIC PULSE MODULATING AND DEMODULATING CIRCUITS

Kenneth William Cattermole, Ralph Bertrand Herman, Wincenty Bezdel, and Kenneth Stanley Darton, all of London, England, assignors to International Standard Electric Corporation, New York, N.Y.

Filed June 5, 1957, Ser. No. 663,704
Claims priority, application Great Britain June 8, 1956
4 Claims. (Cl. 179—15)

This invention relates to improvements in or modifications of the electric pulse modulating or demodulating arrangement or pulse modem described in U.S. application Serial No. 550,163 filed November 30, 1955.

The principal object of this invention is to provide a bothway electric pulse translating arrangement which includes a local circuit for a signal wave; a pulse circuit for a train of periodically repeated pulses; a reactive device; and switching means operable periodically to store energy received from either one of the circuits in the reactive device and to discharge stored energy derived from each circuit into the other circuit; and a low-pass filter in the local circuit having a transfer impedance which approximates to a constant value over a range of frequencies passed through the filter and extending from zero to half the frequency of operation of the switching means, and which approximates to zero at any other frequency passed through the filter; whereby substantially no energy is lost in transmitting energy from either one of said circuits to the other when the signal wave has a frequency between zero and half the switch operation frequency.

According to a second object of the invention, there is provided a bothway electric pulse translating arrangement which includes a local circuit for a signal wave; a pulse circuit for a train of periodically repeated pulses; a reactive device; and switching means operable periodically to store energy received from either one of the circuits in the reactive device and to discharge stored energy derived from each circuit into the other circuit; and a low-pass filter in the local circuit having a response to a current impulse consisting of an oscillating voltage having a value of substantially zero at time intervals after the current impulse equal to integral multiples of the switching time period; whereby substantially no energy is lost in transmitting energy from either one of said circuits to the other when the signal wave has a frequency between zero and half the switch operation frequency.

According to a third object of the invention, there is provided a bothway electric pulse translating arrangement which includes a local circuit for a signal wave; a pulse circuit for a train of periodically repeated pulses; a transistor having the local and pulse circuits connected to the emitter and the collector of the transistor; a reactive device in the local circuit; and a source of switching pulses for application to the base of the transistor to render the transistor periodically conductive, whereby energy received from either circuit and stored in the reactive device is periodically dischargeable into the other circuit.

According to a fourth object of the invention, there is provided a bothway electric pulse communication system connecting two stations which includes a number of local circuits, terminating at each station; a storage capacitor associated with each local circuit, capable of storing energy received from a signal wave carried by the local circuit with which the capacitor is associated, and of delivering stored energy to the associated local circuit to re-form a signal wave to be carried by the local circuit, all the storage capacitors being of equal capacity; a common pulse circuit; a common inductor in the common pulse circuit at each station, the two inductors having equal inductance, and periodically-operable switching means for repeatedly connecting to the common pulse circuit and the common inductors any storage capacitor at one station and a corresponding storage capacitor at the other stations for a time interval substantially equal to one half the resonance period of a common inductor coupled to a storage capacitor; whereby substantially all the energy stored in a storage capacitor at either station is transmitted over the common pulse circuit as one pulse of a periodically recurring train of pulses to a corresponding storage capacitor at the other station, the transmitted pulse energy being discharged from the receiving storage capacitor before reception of the next pulse of the train so as to re-form a signal wave in the local circuit associated with the receiving storage capacitor.

The invention will now be described with reference to the accompanying drawings in which:

FIG. 6 shows a list of formulae used in analysing conditions in the circuit of FIG. 1.

FIG. 7 shows further formulae used in analysing conditions in the circuit of FIG. 1.

FIG. 8 explains the symbols used in the formulae of FIGS. 6, 7 and in subsequent figures.

FIG. 9 shows formulae used in anlysing conditions obtaining when two pulse modems, each provided with a filter, are connected to each other, and the electrical characteristics of the connection are taken into account.

Figure 10:
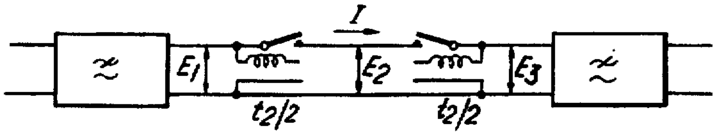

FIG. 10 shows a two-way pulse transmission system.

Figure 11:
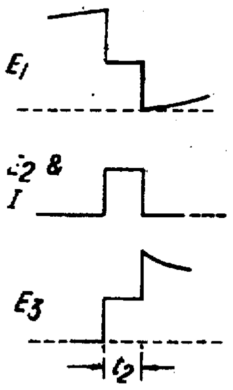

FIG. 11 shows pulse waveforms relating to the system of FIG. 10.

Figure 12:
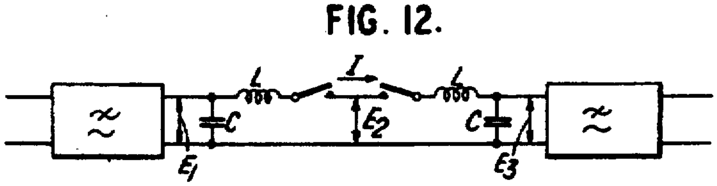

FIG. 12 shows a two-way pulse transmission system using tuned circuits.

Figure 13:
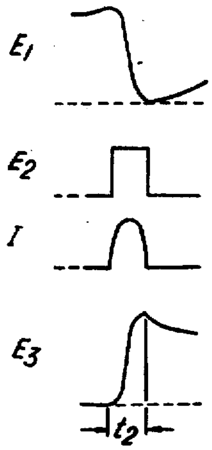

FIG. 13 shows pulse wave-forms relating to the system of FIG. 12.

Figure 14:
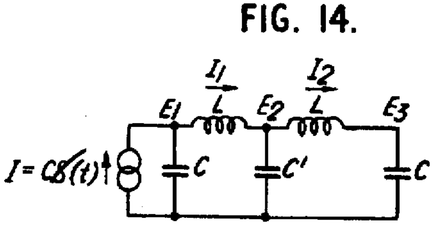

FIG. 14 shows a circuit used in explaining the working of the system of FIG. 12 under certain conditions.

Figure 15:
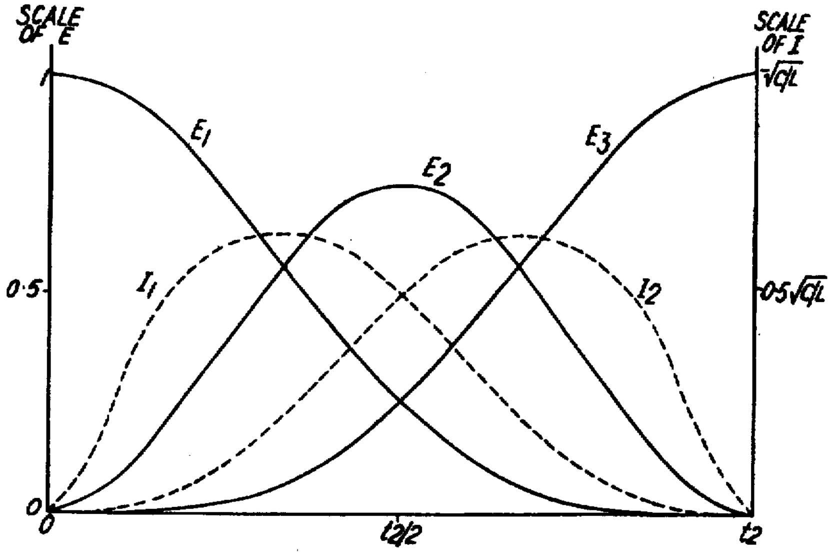

FIG. 15 shows pulse waveforms relating to the system of FIG. 12 under certain conditions.

FIG. 16 shows equations used in connection with FIGS. 10–15.

Figure 17:
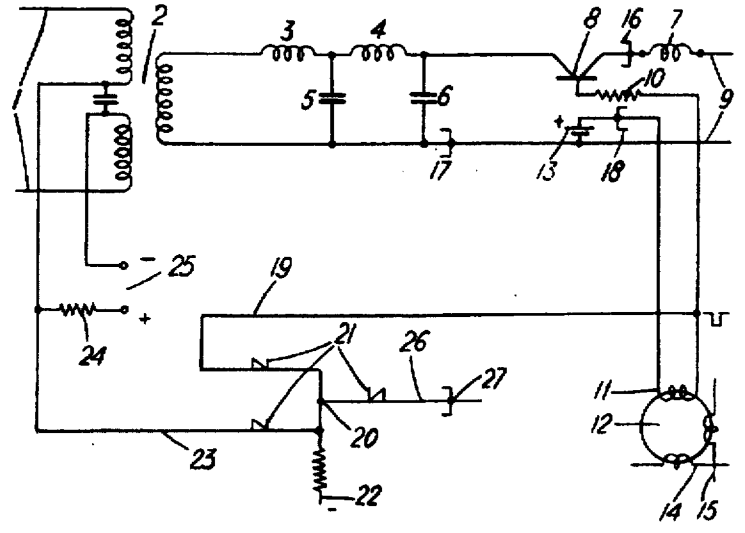

FIG. 17 shows a circuit according to the system of FIG. 12 adapted to serve as a line circuit in a telephone exchange.

Figure 18:
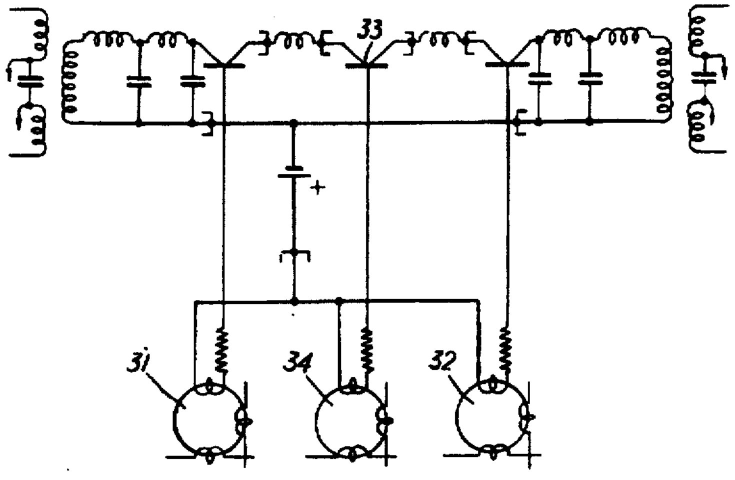

FIG. 18 shows a subscriber-to-subscriber connection in a telephone exchange using the line circuit of FIG. 17.

An ideal reactance does not dissipate energy but can store it. In a communicating system connecting two local circuits A, B, a pulse modem is provided for each local circuit. Each pulse modem contains a reactance network used as a store. In the transmission of a signal from local circuit A to local circuit B, the store associated with local circuit A is charged up slowly and then, in a short period $t_2$ (the pulse duration or width) the charge in store A is rapidly transferred to store B. In a further period $t_1$–$t_2$ where $t_1$ is the pulse repetition period the store B discharges into its local circuit. This process happens repetitively, and a steady state with substantial power transfer can be established even if (as normally occurs) the discharge of store B into its load is incomplete. The capacity for each store is of course adequate to store the energy of the maximum signal strength likely to be encountered.

It is very desirable, however, that the exchange of charge between stores A and B should be complete or very nearly so. For this reason, a good modem network consists of two parts, one of which is capable of discharging completely into a similar network in the short period $t_2$.

This part is either:

(*a*) A delay line of length $\frac{1}{2}t_2$, whose electric charge flows into a similar line in the form of a rectangular pulse of current lasting for time $t_2$: or (*b*) A series tuned circuit whose component values are chosen to make $\sqrt{LC}=t_2/\pi$, so that it executes one half cycle of oscillation in the period $t_2$. This half cycle transfers charge from the condenser of one store to that of the other in the form of a sinusoidal pulse of current.

The other part of the network normally takes the form of a low-pass filter. This general statement appears in the above-mentioned application. In this specification the desired properties of a filter are considered and it is shown that they lead to the desired perfect transmission. Different methods of connecting two pulse modems, each incorporating a filter, are reviewed.

To calculate the transmission performance, we regard the delay line or tuned circuit which is charged or discharged completely in the short period $t_2$ as equivalent to a condenser charged or discharged by infinitesimally short current pulses. It can be shown that this is a good approximation to a completely rigorous theory, and results predicted on this basis are in good agreement with experiment.

Figure 1:
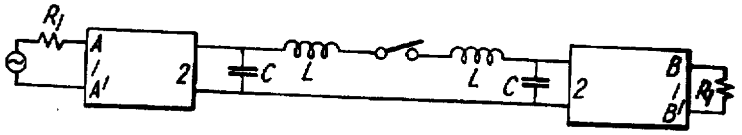
FIG. 1 is a circuit diagram showing two pulse modems directly connected to each other.
Figure 2:
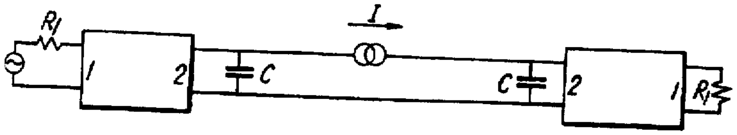
FIGS. 2, 3 are diagrams used in analysing conditions in the circuit of FIG. 1.
Figure 3:
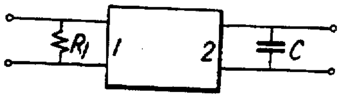

A pair of modems with a switch connection is shown schematically in FIG. 1. The switch may be of any suitable type, one suitable type being a symmetrical junction transistor in which the circuit leads to be connected terminate at the collector and the emitter, and in which switching pulses are applied to the base to render the switch conductive. With transistors which are not of the symmetrical junction type, more than one transistor per switch would probably be used. The blocks in FIG. 1 represent a low-pass reactance network of arbitrary form. By the argument cited above, we analyse the system in terms of an equivalent circuit, FIG. 2, where the current I is to be taken as a series of short impulses at repetition rate $1/t_1$ (substantially the current which actually flows through the switch in FIG. 1). It is found that the overall insertion voltage ratio of the pulse system (i.e. the ratio of the voltage across the receiving load across terminals BB', in FIG. 1, to that which could be obtained by connecting BB' directly to AA') can be calculated in terms of the properties of the network shown in FIG. 3 made up of C, $R_1$ and the arbitrary intervening network.

The properties used are:

(*a*) The steady-state transfer impedance $H(j\omega)$ between the pairs of terminals. If a current $e^{j\omega t}$ flows into one pair, a voltage $e^{j\omega t}.H(J\omega)$ appears across the other.

(*b*) The impulse response $A(t)$ of the network viewed from the right-hand end. If an impulse of current flows into the terminal pair adjacent to C, a voltage waveform $A(t)$ appears across that pair.

(*c*) Quantities G, $G_1$ as shown in FIG. 7.

With an alternating E.M.F. of frequency $\omega/2\pi$ from the generator in FIG. 1, the insertion voltage ratio is given by the Formula *a* of FIG. 7. A transmission system with sampling at a rate of $1/t_1$ can in principle transmit a signal perfectly only if the signal bandwidth is not more than $\frac{1}{2}t_1$. It may be shown that insertion loss over this bandwidth, in the present system, is minimised by choosing the function $A(t)$ so that $A(rt_1)=0$ for $r\neq 0$. Physically, this means that the voltage waveform educed by a current impulse is an oscillation of the general form shown in FIG. 4, which is known to be produced by a low-pass filter. The insertion loss then reduces to the simple form (*b*) of FIG. 6. It will appear that this factor can be made almost unity within the passband ($\omega<\pi/t_1$).

Figure 4:
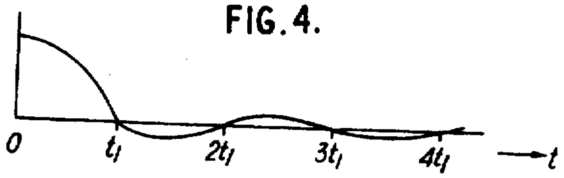
FIG. 4 shows a voltage waveform educed by a current impulse.

This reasoning leads to two requirements for the filter circuit, firstly, that $H(j\omega)$ should be a reasonable sort of low-pass function (since its square enters into the transmission function): secondly, that $A(t)$ should have the form of FIG. 4, passing through zero at $t=rt_1$.

Two forms of ideal filter which combine these requirements have been found. Consider first a filter which transmits without loss up to $\omega=\pi/t_1$ and cuts off infinitely sharply thereafter. The formulae for this filter are shown in FIG. 6(*c*), (*d*). Substituting the expressions (*c*), (*d*) of FIG. 6 into the equation for insertion loss, (*a*) of FIG. 6 yields the Equation *e* of FIG. 6. That is, we have lossless transmission over a bandwidth equal to half the sampling rate.

Figure 5:
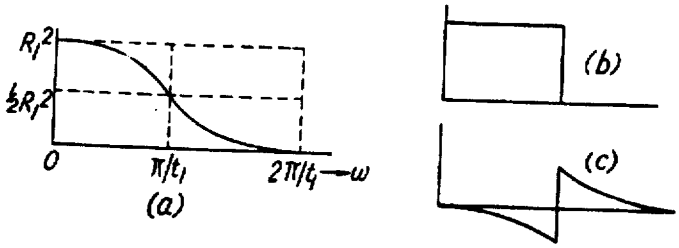
FIG. 5 shows graphs relating to a transmission modulus.

Secondly, consider a filter for which the transmission-modulus-squared $|H(j\omega)|^2$ has the form indicated in FIG. 5(*a*). The shape is arbitrary except that it has skew-symmetry about the frequency $\pi/t_1$ and the magnitude 1/2, so that it can be considered as the sum of a rectangle and a skew-symmetric function as indicated in FIG. 5(*b*) and (*c*). It can be shown that for this filter also $$A(o)=2R_1/t_1$$
$$A(rt_1)=0$$
$$r\neq 0$$

The overall transmission is then as shown in (*f*) of FIG. 6 which is unity at low frequencies and cut off gradually up to $\omega=2\pi/t_1$ beyond which it is zero.

The first filter is really a special case of the second, but was cited separately because it leads to the *limiting* performance, namely lossless transmission over the greatest possible bandwidth.

In either case, it can be shown that the asymptotic impedance of the filter at high frequencies is that of a capacitance $t_1/2R_t$, so that any practical realisation will have a terminal capacitance of this value. A delay line of length $\frac{1}{2}t_2$ and impedance $R_2$ has a capacitance $t_2 2R_2$, so that if this is incorporated as the terminal capacitance the formula (*g*) of FIG. 6 applies.

The filter curves cited are not physically realisable with a finite number of elements. They may be approximated by finite networks with an accuracy increasing with the number of elements used.

There is no unique method of approximation. The one which has been most fully studied so far is the use of maximally flat filters of N elements, for which the Formula *h* of FIG. 6 applies. This Formula *h* is unity at low frequencies, one half at $\omega=\pi/t_1$ and cuts off thereafter at a rate of 6 N decibels per octave. The component values for a filter of this type are well known. In particular, the terminal capacitance is given by the Equation *i* of FIG. 6. The value of C shown in (*i*) is very near the ideal calue $t/2R_1$ for large N, say $N>3$. The impulse response $A(t)$ does not pass exactly through zero at $t=rt_1$ but is very small at these points for $N>3$.

The practical performance obtained with the known method of approximation is good enough to justify its usage in electronic switching. For a maximally-flat filter of three elements, the impulse response obtained differs from the ideal by about one part in 300. If desired a filter of the equal-ripple type could be used instead of a filter of the maximally flat type.

So far, the consideration has been given only to the case in which two pulse modems, each incorporating a filter, are connected directly to each other. Before considering other methods of connection, and to facilitate comparison between the various methods, it is desirable to introduce two quantities G, $G_1$ which may be defined by the Formulae (*a*) and (*b*) of FIG. 7. In this notation, Formula *a* of FIG. 6 may be written as shown at (*c*) of FIG. 7.

Now consider two pulse modems, each incorporating a filter, which are connected to each other by a channel which includes a repeater. In this case communication between the modems can take place in one direction only. Suppose $R_2$ represents the resistance of the repeater. If the repeater is assumed to have an available gain of unity, it may be shown that the insertion voltage ratio is given by Formula $a$ of FIG. 9 of this specification. With an ideal filter having the characteristics represented by Formula $c$ of FIG. 6, the insertion voltage ratio reduces to the value given by Formula $e$ of FIG. 6.

If two modems, each incorporating a filter, are connected together over a channel which does not have a repeater, both-way communication between the modems is possible. Suppose the channel has a delay equal to one half of an integral multiple $n$ of the pulse repetition rate $t_1$ and an attenuation of $l$ nepers. The insertion voltage ratio is then given by Formula $b$ of FIG. 9 of this specification, which with the ideal filter reduces to the values given by formulae ($c$) and ($d$) of FIG. 9. The differences between these values and those given by Formula $e$ of FIG. 6 are due solely to the delay and attenuation of the line.

Two modems, each incorporating a filter, may be connected to each other by means of an intermediate store. Each modem is connected to the store for a time $t_2$, but the two modems are not connected to the store simultaneously. A pulse is transmitted from a first to a second modem in two stages, namely from the first modem to the intermediate store as a first pulse of duration $t_2$ and thereafter from the store to the second modem as a second pulse of duration $t_2$. Let $\tau$ represent the time interval between the first and second pulses i.e. the period during which the pulse energy is retained in the store. It may be shown that the insertion voltage ratio is given by Formula $e$ of FIG. 9 of this specification, and that with the ideal filter this reduces to the values given by the formulae ($f$) and ($g$) of FIG. 9. For transmission in the reverse direction, the time interval between pulses is $t_1-\tau$. In either case the values obtained differ from those given by Formula $c$ of FIG. 6 only by a delay equal to the time the pulse energy is retained in the intermediate store.

It is desired now to consider the case where two pulse modems, each incorporating a filter, are connected with each other by means of a capacitative channel. The circuit of FIG. 10 shows the connection of two pulse modems, each of which embodies a store in the form of a delay line. Let the potential across the stores be represented by $E_1$, $E_3$, and that at the mid-point of the connecting channel by $E_2$. If now the connecting channel is completed by closing the switches for a suitable short period $t_2$, a charge on one store is transferred to the other in accordance with the curves of FIG. 11. If the channel has appreciable capacitance, the interchange is not complete, causing transmission loss; and a charge is left on the line after each pulse, causing crosstalk in a multiples system.

The use of tuned circuit stores in place of the delay line offers a number of advantages, most notably that the effect of line capacitance mentioned above may be annulled.

A pair of modems embodying tuned circuits are shown in FIG. 12, and the waveforms relating to a pulse transmission in the absence of line capacitance are shown in FIG. 13. The resonant frequency of the circuit is such that it executes one half cycle of oscillation in the pulse period $t_2$, where $t_2$ may be determined from Equation $a$ of FIG. 16. The current flowing when the switch is closed is a half sine wave, while the voltages across the storage capacitances are half sine waves in antiphase with each other and in quadrature with the current. If the peak voltage cross either store is unity, the peak current is given by Equation $b$ of FIG. 16. As with a pair of delay line stores, the exchange of charge is complete provided that there is no capacitance across the common line and that the switches are closed for precisely the period $t_2$. However, because the current rises gradually from zero at the start, and falls gradually to zero at the end of a pulse, imprecision of timing causes smaller errors than with delay line stores. Also, the energy of the half-sine current pulse is mainly at the lower end of the frequency spectrum, reducing the likelihood of induction between cables or components.

To find the waveforms in the presence of capacitance on the common line, we study the network of FIG. 14. The components L, C are the storage tuned circuits, while C' simulates line capacitance. To simulate the closure of switches when the left-hand storage capacitor C is charged to unit potential, we assume an impulsive current of moment C, which instantaneously charges the the condenser and then leaves the network to execute its natural oscillations. It may be shown that the values of $E_1$ and $E_3$ are as given Equations $c$ and $d$ of FIG. 16. If simultaneously $\cos \alpha t=-1$ and $\cos \beta t=1$, then the charges on the capacitors C have been completely interchanged, since $E_1$ is zero and $E_3$ is unity. Also, since the total charge on the two storage capacitors is the same as at the beginning, there can be no charge on the line capacitance C' at this moment. The coincidence occurs when $p$ cycles of $\cos \beta t$ occupy the same time as $(q-1/2)$ cycles of $\cos \alpha t$, as shown by Equation $e$ of FIG. 16, where $p$ and $q$ are any positive integers. It follows that complete transfer can be effected, despite the presence of line capacitance, for an infinite number of capacitance ratios so long as the resulting inductance values and waveforms are acceptable.

The case of practical significance is $p=q=1$ with $k=3/2$. The waveforms are then based on the half sine wave, modified by some second harmonic; and are as shown in Equations $f$ to $j$ of FIG. 16, and are plotted in FIG. 15. Not only are the transfer waveforms $E_2$, $I_1$ and $I_2$ zero at the beginning and end of the pulse: the derivative of $E_2$ at both bounds, and of the currents at one bound, are also zero: so that the high frequency content of these waveforms is less, and the effect of mistuning less, than in either of the previously mentioned cases.

The component values are easily calculated from Equations $a$ and $k$ of FIG. 16 if C' is given. If C' can be varied to some extent, the designer would use this flexibility to obtain a desired impedance level, decided either on the basis of the pulse path impedance $\sqrt{L/C}$ or to suit the voltage and current limits of some particular electronic switch.

The switches shown on the circuits of FIGS. 10 and 12 will in practice be electronic devices with certain current and voltage limits. If, as has been found convenient, they are balanced diode switches coupled by transformers to transistor pulse generators, there are two distinct types of limit: on the voltage and on the current separately, due to the diodes: and on their product, due to the transistor. The storage circuit here described has the drawback that for a given signal power in the speech path it requires more pulse power to operate the switch than if a delay line is used as a store. The current rating of the switch is set by the peak current during the pulse: the voltage rating by the peak potential difference to be isolated in a multiplex system i.e. the sum of the peak voltage across the store between pulses and the peak voltage on the common line during a pulse. These quantities are tabulated for unit potential difference transferred from one store to another for each type of store mentioned.

| Store | Current [1] | Voltage | Product [1] |
|---|---|---|---|
| Delay line | 1 | 1.5 | 1.5 |
| LC without line capacitance | 1.57 | 1.5 | 2.36 |
| LC with line capacitance C' | 2.04 | 1.75 | 3.57 |

[1] In units of $C/t_1$.

The theory has been verified by measurements on a pair of modems using 2000 pf. storage capacitors and 2 μsec. pulses. The power loss, overall, was 2 db, no more than in similar experiments with delay line stores. The variation in loss for small changes in timing was, as expected, reduced. The line capacitance tolerable in this case, namely 1330 pf., is large enough to permit the use of perhaps 250 switches or 250 gates in parallel at each end of the transmission channel connecting the two modems. This number is unlikely to be exceeded in a non-demodulating four-digit telephone exchange. Accordingly, this development is considered to be of use in large-scale time-division switching. One method of applying the development is shown in FIGS. 17, 18.

FIG. 17 shows a pulse modulator and demodulator of the type described in connection with FIG. 12 which is suitable for use as a line circuit in a telephone exchange. A subscriber's line 1 is connected by a transformer 2 to a low-pass filter consisting of two inductors 3, 4 and a capacitor 5. The low-pass filter is connected to a tuned circuit which includes the capacitor 6 and the inductor 7. One terminal of the capacitor 6 is connected via the emitter and collector of a symmetrical junction transistor 8 to the inductor 7. The inductor 7 is connected to one lead of the transmission channel 9. The other terminal of the capacitor 6 is connected to the return lead of the transmission channel 9.

The base of transistor 8 is connected through a resistor 10 and an output winding 11 of a magnetic core 12 to the positive pole of a battery 13, the negative pole of which is connected to the return lead of the transmission channel 9. The magnetic core 12 has two control windings 14, 15, and is so arranged that when pulses are present simultaneously on the windings 14, 15 a negative-going output pulser is delivered at the output winding 11. While an output is being delivered from the winding 11, the capacitor 6 is effectively connected by the transistor 8 to the inductor 7. During the intervals between successive output pulses, the connection is ineffective. Consequently the inductor 7 may be used during these intervals as a part of a tuned circuit for other subscribers. As indicated by the positions of the commoning points 16, 17, the inductor 7 is included in the common transmission channel 9.

A capacitor 6, a transistor 8 and a magnetic core 12 are provided for each subscriber. By operating the magnetic cores such as 12 in turn, e.g. by a suitable counting circuit, the subscribers are connected in turn to the common inductor 7. The output windings such as 11 for the different subscribers are connected via the commoning point 18 to the common battery 13. When no output is being delivered at a winding 11, positive potential from the common battery 13 passes to the transistor 8 and renders ineffective the connection between the capacitor 6 and the inductor 7.

Besides being connected to the base of the transistor 8, the output winding 11 is also connected to one control lead 19 of a co-incidence gate 20 formed by the three rectifiers 21 and the negative bias supply 22. The second control lead 23 of the coincidence gate 20 is connected via a resistor 24 to the source 25 of direct current supplying the subscriber's line 1. When a dialling impulse is present on the subscriber's line 1, a negative-going pulse is transmitted over lead 23. When, during the duration of this pulse, the magnetic core 12 is operated, a negative-going pulse is delivered over lead 19, opening the coincidence gate 20 and delivering an output on the output lead 26. The magnetic core 12 is operated many times during each dialling impulse. A train of output signals, interrupted to correspond to dialled impulses, is therefore delivered over the output lead 26. This interrupted train of signals is passed forward via the commoning point 27 to operate the common switching equipment in the exchange.

The magnetic core 12 and the coincidence gate 20 may be used with a subscriber's line provided with a delay line, such as is described in the main application. In this event the delay line is used in place of the tuned circuit formed by the capacitor 6 and the inductor 7.

A circuit diagram for one form of a subscriber-to-subscriber connection in a telephone exchange is shown in FIG. 18. In FIG. 18, the line circuit shown is that appearing in FIG. 17, through other types of line circuit could be used. Three switching stages are shown, though other numbers of stages may be desirable in practice. The subscribers' lines connected to the exchange are arranged in groups and the three switching stages in a connection between two subscribers are (1) calling subscriber to calling group, (2) calling group to called group and (3) called group to called subscriber. The speech path for stages (1) and (3) is completed by the calling and called line circuits under the control of the magnetic cores 31, 32 as already described. The group-group stage (2) includes a transistor 33 controlled by a magnetic core 34. If the three cores 31, 32, 34 are operated in synchronism, speech over the connection is possible. If the cores are not operated in synchronism it is necessary to delay the speech signals at one or more points along the transmission path. A method of delaying the speech signals is to use an intermediate store as described above. An example of the use of such a store is described in British Patent 822,297, issued February 10, 1960.

While the principles of the invention have been described above in connection with specific embodiments, and particular modifications thereof, it is to be clearly understood that this description is made only by way of example and not as a limitation on the scope of the invention.

What we claim is:

1. A bothway electric pulse translating arrangement which includes a local circuit for a signal wave and a pulse circuit for a train of periodically repeated pulses comprising a transistor having the local and pulse circuits connected to the emitter and the collector of the transistor; a reactive storage device in the local circuit; and a source of switching pulses for application to the base of the transistor to render the transistor periodically conductive, whereby energy received from either said local circuit or said pulse circuit and stored in the reactive device is periodically discharged into the other circuit.

2. A bothway electric pulse communication system including two bothway translating arrangements and a communication channel connecting said two translating arrangements, each of said translating arrangements including a local circuit for a signal wave, a pulse circuit for a train of periodically repeated pulses, a reactive storage device, and switching means connected in a series circuit with said reactive device and said pulse circuit operable periodically to store in said reactive device energy from said pulse circuit and simultaneously to discharge into said pulse circuit energy stored in said reactive device from said local circuit, and further including an intermediate reactive storage device in the communication channel for storing energy transmitted by either translating arrangement and an intermediate switching device operated synchronously and in time spaced relation with said first mentioned switching device to subsequently transmit the stored energy to the other translating arrangement, whereby energy transmitted by either translating arrangement may be retained in the intermediate store for a predetermined time before being delivered to the other translating arrangement.

3. A bothway electric pulse communication system comprising a first station: a second station remote from said first station: a transmission channel coupled between said stations: each of said stations including a plurality of local circuits, each having a storage capacitor and a periodically controlled switching means; and an inductor coupled to said transmission channel: and means to control each of said switching means to sequentially couple each of said storage capacitors of said first station to said inductor of said first station and to sequentially couple each of said storage capacitors of said second station to said inductor of said second station to provide a communication path between one of said local circuits of said first station and an associated one of said local circuits of said second station, whereby substantially all the energy stored in a storage capacitor at either station is transmitted over said transmission channel as one pulse of a periodically recurring train of pulses to a corresponding storage capacitor at the other station, the transmitted pulse energy being discharged from the receiving storage capacitor before reception of the next pulse of the train so as to reform the signal wave of the local circuit associated with the sending storage capacitor in the local circuit associated with the receiving storage capacitor.

4. An electric pulse translating arrangement comprising a local circuit for a signal wave, a transmission line for a train of periodically repeated pulses, a low pass filter in said local circuit, a reactive storage device comprising an inductor coupled in series relation with said line and a capacitor coupled to terminate said filter, and switching means coupled between said capacitor and said inductor operable periodically to transfer energy between said storage device and said transmission line.

References Cited in the file of this patent

UNITED STATES PATENTS

| | | |
|---|---|---|
| 2,659,774 | Barner | Nov. 17, 1953 |
| 2,691,073 | Lowman | Oct. 5, 1954 |
| 2,718,621 | Haard et al. | Sept. 20, 1955 |
| 2,801,281 | Oliver et al. | July 30, 1957 |
| 2,810,081 | Elliot | Oct. 15, 1957 |
| 2,815,486 | Estes | Dec. 3, 1957 |
| 2,870,259 | Norris | Jan. 20, 1959 |
| 2,881,332 | Jensen | Apr. 7, 1959 |